United States Patent
Nakamura (10) Patent No.: US 10,473,044 B2
(45) Date of Patent: Nov. 12, 2019

(54) CONTROL DEVICE FOR INTERNAL COMBUSTION ENGINE

(71) Applicant: Toyota Jidosha Kabushiki Kaisha, Toyota-shi, Aichi-ken (JP)

(72) Inventor: Sho Nakamura, Susono (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 15/895,426

(22) Filed: Feb. 13, 2018

(65) Prior Publication Data

US 2018/0230916 A1 Aug. 16, 2018

(30) Foreign Application Priority Data

Feb. 14, 2017 (JP) ................................. 2017-025222

(51) Int. Cl.
*F02D 13/02* (2006.01)
*F02D 41/00* (2006.01)
(Continued)

(52) U.S. Cl.
CPC ....... *F02D 41/006* (2013.01); *F02D 13/0242* (2013.01); *F02D 13/0265* (2013.01); *F02D 13/06* (2013.01); *F02D 41/008* (2013.01); *F02D 41/0055* (2013.01); *F02D 41/0082* (2013.01); *F02D 41/0087* (2013.01); *F02D 41/062* (2013.01); *F02D 41/064* (2013.01); *F02D 41/1446* (2013.01); *F02D 41/1454* (2013.01);
(Continued)

(58) Field of Classification Search
CPC .. F02D 13/0242; F02D 13/0265; F02D 13/06; F02D 41/006; F02D 41/008; F02D 41/064; F02D 41/0082; F02D 41/0087; F02M 26/01
See application file for complete search history.

(56) References Cited

U.S. PATENT DOCUMENTS

2001/0017123 A1* 8/2001 Raab ..................... F02B 1/12
123/305
2003/0074891 A1 4/2003 Tamura et al.
(Continued)

FOREIGN PATENT DOCUMENTS

JP 2002-048039 A 2/2002
JP 2002-221029 A 8/2002
(Continued)

*Primary Examiner* — Jonathan R Matthias
(74) *Attorney, Agent, or Firm* — Dinsmore & Shohl LLP (57) ABSTRACT

Provided is a control device for an internal combustion engine. The internal combustion engine includes cylinders, intake ports, exhaust ports, intake values, exhaust valves, fuel injection valves, and an exhaust valve stop mechanism. The control device includes an electronic control unit configured to control the fuel injection valves so as to inject the feel into the some cylinders at least during a period of time of a compression stroke or an expansion stroke of the some cylinders, control the exhaust valve stop mechanism so as to stop the exhaust valves of the exhaust ports of the some cylinders in a valve-closed state, and control the intake valves so as to open the intake valves at least during a period of time of an intake stroke of the some cylinders such that exhaust gas is recirculated to each of the cylinders via the intake ports of the some cylinders.

6 Claims, 9 Drawing Sheets

(51) Int. Cl.
    *F02M 26/01*     (2016.01)
    *F02D 41/06*     (2006.01)
    *F02D 41/14*     (2006.01)
    *F02D 41/38*     (2006.01)
    *F02D 13/06*     (2006.01)
    *F02M 26/42*     (2016.01)
    *F01N 3/10*     (2006.01)

(52) U.S. Cl.
    CPC ............ *F02D 41/38* (2013.01); *F02M 26/01* (2016.02); *F02M 26/42* (2016.02); *F01N 3/10* (2013.01); *F01N 2430/08* (2013.01); *F02D 2041/0012* (2013.01); *F02D 2041/389* (2013.01); *F02D 2200/021* (2013.01); *F02D 2200/0414* (2013.01)

(56) References Cited

U.S. PATENT DOCUMENTS

2011/0232607 A1*   9/2011  Yoshioka ............. F02D 41/008
                                                                  123/445
2015/0136097 A1*   5/2015  Hoshi ................. F02D 19/0615
                                                                  123/575

FOREIGN PATENT DOCUMENTS

| | | |
|---|---|---|
| JP | 2006-183493 A | 7/2006 |
| JP | 2007-016730 A | 1/2007 |
| JP | 2010-065565 A | 3/2010 |
| JP | 2010-084645 A | 4/2010 |
| JP | 2012-127296 A | 7/2012 |
| JP | 2012-154226 A | 8/2012 |
| WO | 2011/117970 A1 | 9/2011 |

* cited by examiner

CONTROL DEVICE FOR INTERNAL COMBUSTION ENGINE

CROSS REFERENCE TO RELATED APPLICATIONS

This application claims priority to Japanese Patent Application No. 2017-025222 filed on Feb. 14, 2017, which is incorporated herein by reference in its entirety including the specification, drawings and abstract.

BACKGROUND

1. Technical Field

The present disclosure relates to a control device for an internal combustion engine, and particularly, to a control device for an internal combustion engine that can selectively stop exhaust valves of exhaust ports of some cylinders of a plurality of cylinders in a valve-closed state.

2. Description of Related Art

In the related art, for example, Japanese Unexamined Patent Application Publication No. 2010-84645 (JP 2010-84645 A) discloses a technique for increasing the amount of internal EGR at the restart of an engine. In the above technique, providing a negative overlap period in which both an intake valve and an exhaust valve are brought into a closed state in an exhaust stroke or an intake stroke at the restart of the engine is performed. The amount of internal EGR, which is burnt gas remaining in a combustion chamber, is increased by providing the negative overlap period. Accordingly, since a rise in exhaust gas temperature is suppressed at the restart of the engine when recirculated exhaust gas cannot be used via an EGR passage, NOx emission is reduced.

SUMMARY

Figure 13:
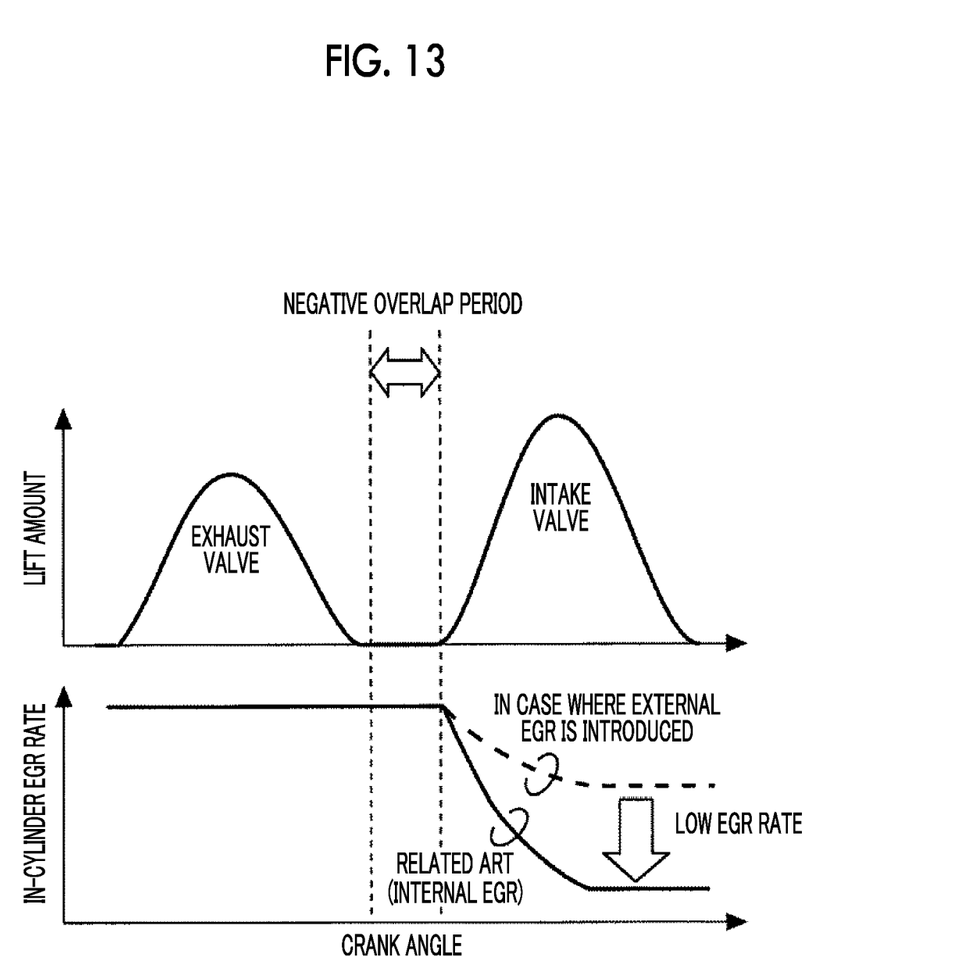
FIG. 13 is a view for describing a relationship of an in-cylinder EGR rate with respect to a crank angle.

However, the internal EGR has the following disadvantages due to providing the negative overlap period. FIG. 13 is a view for describing a relationship of an in-cylinder EGR rate with respect to a crank angle. As illustrated in FIG. 13, the in-cylinder EGR rate caused by providing the negative overlap period cannot be as high as an EGR rate caused by external EGR using the EGR passage. For this reason, in the above related art, there is still room for improvement in obtaining a higher NOx-reducing effect.

The present disclosure provides a control device for an internal combustion engine that can further enhance the effect of reducing NOx to be emitted.

An aspect of the present disclosure relates to a control device for an internal combustion engine. The internal combustion engine includes a plurality of cylinders, a plurality of intake ports, a plurality of exhaust ports, a plurality of intake valves, a plurality of exhaust valves, a plurality of fuel injection valves, and an exhaust valve stop mechanism. The intake ports are configured to communicate with the cylinders from an intake passage of the internal combustion engine, respectively. The exhaust ports are configured to communicate with the cylinders from an exhaust passage of the internal combustion engine, respectively. The intake valves are configured to open and close the intake port communicating with the cylinders, respectively. The exhaust valves are configured to open and close the exhaust port communicating with the cylinders, respectively. The fuel injection valves are configured to inject fuel into the cylinders, respectively. The exhaust valve stop mechanism is configured to selectively stop the exhaust valves of the exhaust ports of some cylinders of the cylinders in a valve-closed state. The control device includes an electronic control unit. The electronic control unit is configured to control the fuel injection valves so as to inject the fuel into the some cylinders at least during a period of time of a compression stroke or an expansion stroke of the some cylinders, control the exhaust valve stop mechanism so as to stop the exhaust valves of the exhaust ports of the some cylinders in a valve-closed state, and control the intake valves so as to open the intake valves at least during a period of time of an intake stroke of the some cylinders such that exhaust gas is recirculated to each of the cylinders via the intake ports of the some cylinders.

In the control device according to the aspect of the present disclosure, the electronic control unit may be configured to limit execution of a control in which the exhaust gas is recirculated via the intake ports of the some cylinders before starting of the internal combustion engine is completed.

In the control device according to the aspect of the present disclosure, the electronic control unit may be configured to determine execution or non-execution of a control in which the exhaust gas is recirculated via the intake ports of the some cylinders in accordance with a coolant temperature of the internal combustion engine.

In the control device according to the aspect of the present disclosure, the electronic control unit may be configured to determine execution or non-execution of a control in which the exhaust gas is recirculated via the intake ports of the some cylinders in accordance with ambient air temperature.

In the control device according to the aspect of the present disclosure, the internal combustion engine may include a catalyst device in the exhaust passage, and the electronic control unit may be configured to control the fuel injection valves so as to change an injection amount of the fuel to be injected into the some cylinders such that intake oxygen concentration that is a proportion of oxygen in gas suctioned into the some cylinders or temperature of the exhaust gas to be exhausted into the exhaust passage daring execution of a control in which the exhaust gas is recirculated via the intake ports of the some cylinders is adjusted.

In the control device according to the aspect of the present disclosure, the electronic control unit may be configured to control the feel injection valves so as to change the injection amount of the fuel to be injected into the some cylinder such that the intake oxygen concentration reaches a predetermined target value in a case where the temperature of the exhaust gas flowing into the catalyst device has reached a predetermined threshold value, and the electronic control unit is configured to control the fuel injection valves such that the injection amount of the some cylinders of the cylinders becomes smaller than an injection amount of the other cylinders of the cylinders in a case where the temperature of the exhaust gas flowing into the catalyst device has not reached the predetermined threshold value.

According to the control device of the aspect of the present disclosure, the electronic control unit is configured to control the exhaust valve stop mechanism so as to stop the exhaust valves of the exhaust ports of the some cylinders in a valve-closed state, control the fuel injection valve so as to inject the feel into the some cylinders at least during a period of time of the compression stroke or the expansion stroke of the some cylinders, and control the intake valves so as to open the intake valves at least during a period of time of an intake stroke of the some cylinders. Accordingly, since the total amount of the exhaust gas of the some cylinders can be blown back to the intake passage and can be sucked from the intake ports of the cylinders, the EGR rate of the internal EGR can be effectively raised. Accordingly, it is possible to further alliance the effect of reducing NOx to be emitted.

According to the aspect of the present disclosure, the electronic control unit is configured to limit the execution of the control in which the exhaust gas is recirculated via the intake ports of the some cylinders before the starting of the internal combustion engine is completed. For this reason, poor starting caused by the internal EGR being introduced before starting is completed can be suppressed.

According to the aspect of the present disclosure, the execution or non-execution of the control in which the exhaust gas is recirculated via the intake ports of the some cylinders is determined in accordance with coolant tempera tore of the internal combustion engine. The coolant temperature for an internal combustion engine becomes an index for determining whether or not EGR is introduced. For this reason, it is possible to effectively suppress occurrence of a problem caused by the introduction of EGR.

According to the aspect of the present disclosure, the electronic control unit determines the execution or non-execution of the control in which the exhaust gas is recirculated via the intake ports of the some cylinders in accordance with the ambient air temperature. The ambient air temperature becomes an index of generation of smoke and generation of condensed water when EGR is introduced. For this reason, it is possible to effectively suppress occurrence of a problem caused by the introduction of EGR.

According to the aspect of the present disclosure, the electronic control unit is configured to control the fuel injection valve so as to change the injection amount of the fuel to be injected into the some cylinders such that the intake oxygen concentration that is the proportion of the oxygen in the gas suctioned into the some cylinders or the temperature of the exhaust gas to be exhausted into the exhaust passage during the execution of the control in which the exhaust gas is recirculated via the intake ports of the some cylinders is adjusted. Since fuel-rich exhaust gas is recirculated to each cylinder as the injection amount of the some cylinders is increased, the intake oxygen concentration becomes low. Since the injection amount of the other cylinders is increased in order to generate equal torque when the injection amount of the some cylinders is reduced, the temperature of the exhaust gas consequently becomes high. For this reason, by changing the injection amount of the some cylinders, it is possible to freely control the intake oxygen concentration or the temperature of the exhaust gas.

According to the aspect of the present disclosure, the electronic control unit is configured to control the fuel injection valve so as to change the injection amount of the some cylinders such that the intake oxygen concentration reaches the predetermined target value in the case where the temperature of the exhaust gas flowing into the catalyst device has reached the threshold value, and the electronic control unit is configured to control the fuel injection valve such that the injection amount of the some cylinders of the cylinders becomes smaller than the injection amount of the other cylinders in the case where the temperature of the exhaust gas flowing into the catalyst device has not reached the threshold value. For this reason, since it is possible to switch between the control of the intake oxygen concentration and the control of the exhaust gas temperature in accordance with the temperature of the exhaust gas flowing into the catalyst device, it is possible to further enhance the effect of reducing NOx to be emitted by combining enhancing of the NOx control rate of the catalyst device with reducing of NOx to be emitted from the internal combustion engine.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION THE EMBODIMENTS

Hereinafter, embodiments of the present disclosure will be described with reference to the drawings. However, except for cases where numbers, such as the numbers, quantities, amounts, and ranges of respective elements, are mentioned in the embodiments shown below, and particularly, cases where the numbers, such as the numbers, quantities, amounts, and ranges of respective elements are explicitly stated or are clearly specified in principle, the present disclosure is not limited to the mentioned numbers. The structures, steps, and the like to be described in the embodiments shown below are not necessarily indispensable to the present disclosure except for cases where the structures, the steps, and the like are explicitly stated or are dearly specified in principle.

Embodiment 1

Embodiment 1 of the present disclosure will be described with reference to drawings.

Configuration of Embodiment 1

Figure 1:
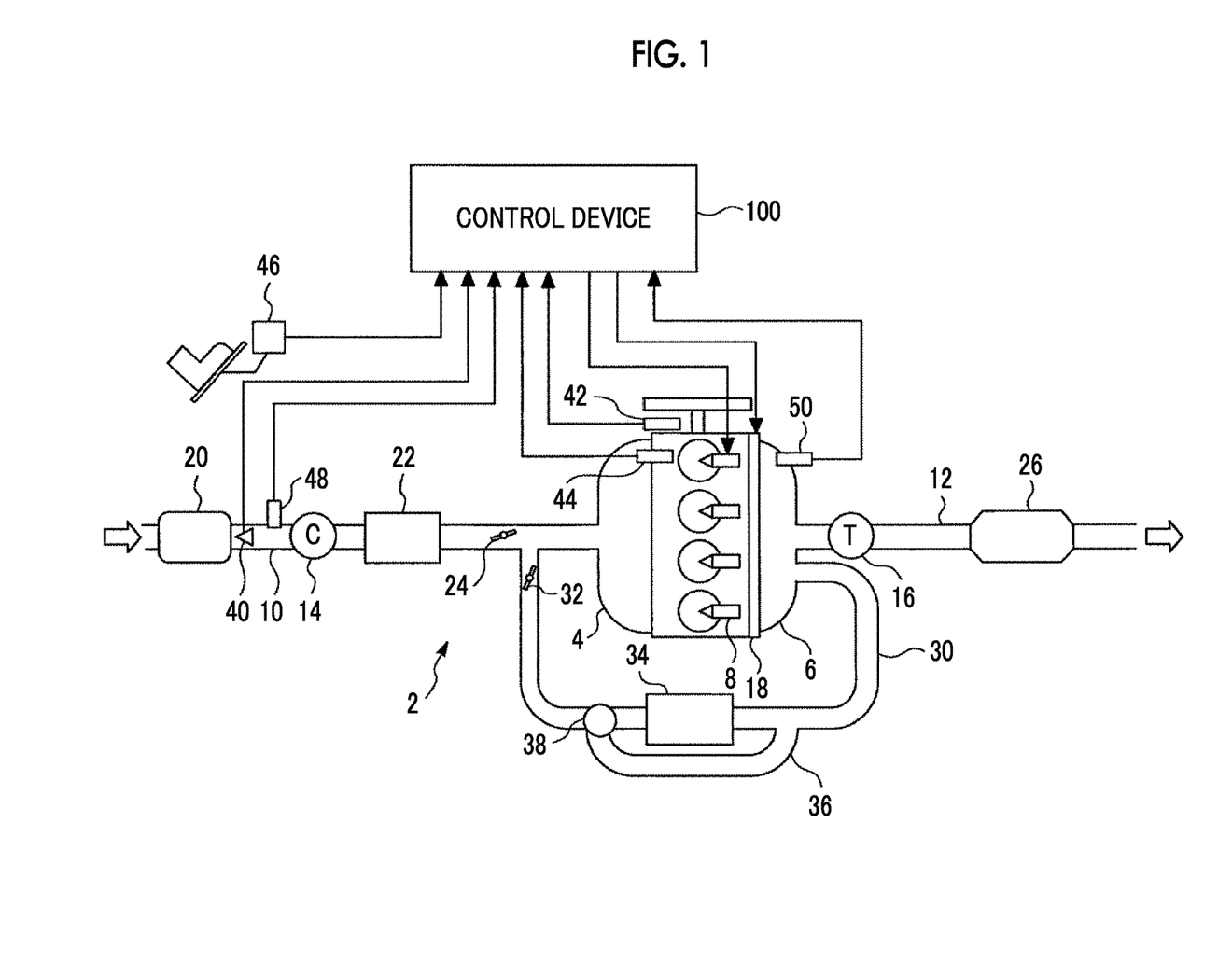
FIG. 1 is a view illustrating the configuration of an engine system related to Embodiment 1.

FIG. 1 is a view illustrating the configuration of an engine system related to Embodiment 1. An internal combustion engine of the present embodiment is a compression ignition type internal combustion engine with a turbosupercharger (hereinafter referred to as an engine). A plurality of (four in the drawing) cylinders is provided in series in the engine 2. A piston is disposed inside each cylinder, and a fuel injection valve 8 is provided for each cylinder. An intake manifold 4 and an exhaust manifold 6 are attached to the engine 2. The intake manifold 4 communicates with an intake port (not illustrated) of each cylinder. The exhaust manifold 6 communicates with an exhaust port (not illustrated) of each cylinder.

An intake pipe 10 through which the air (fresh air) taken in from an air cleaner 20 flows is connected to the intake manifold 4. The intake manifold 4 and the intake pipe 10 constitute an intake passage of the engine 2. A compressor 14 of the turbosupercharger is attached to the intake pipe 10. In the intake pipe 10, a throttle 24 is provided downstream of the compressor 14. In the intake pipe 10, an intercooler 22 is provided between the compressor 14 and the throttle 24.

An exhaust pipe 12 for releasing exhaust gas into the ambient air is connected to the exhaust manifold 6. The exhaust manifold 6 and the exhaust pipe 12 constitute an exhaust passage of the engine 2. A turbine 16 of the turbosupercharger is attached to the exhaust pipe 12. In the exhaust pipe 12, a catalyst device 26 for controlling exhaust gas is provided downstream of the turbine 16.

An intake valve for opening and closing the intake port and an exhaust valve for opening and closing the exhaust port are provided in each cylinder. The engine 2 includes an exhaust valve stop mechanism 18 which selectively stops the exhaust valves of the exhaust ports of some cylinders of the cylinders in a valve-closed state. The exhaust valve stop mechanism 18 of the present embodiment 1 is configured to stop the exhaust valves of #2 cylinder and #3 cylinder of the four cylinders in a valve-closed state. In the following description, #2 cylinder and #3 cylinder that stop the exhaust valves in a valve-closed state are referred to as "exhaust valve stop cylinders", and the remaining #1 cylinder and #4 cylinder excluding the exhaust valve stop cylinders are referred to as "operating cylinders".

The engine 2 includes an EGR system that recirculates exhaust gas from an exhaust system to an intake system. In the EGR system, a position of the intake pipe 10 downstream of the throttle 24 and the exhaust manifold 6 are connected together by an EGR passage 30. The EGR passage 30 is provided with an EGR valve 32. An EGR cooler 34 is provided on an exhaust side with respect to the EGR valve 32 of the EGR passage 30. The EGR passage 30 is provided with a bypass passage 36 that bypasses the EGR cooler 34. A bypass valve 38, which changes the ratio of the flow rate of the exhaust gas flowing through the EGR cooler 34 and the flow rate of the exhaust gas flowing through the bypass passage 36, is provided at a point where the EGR passage 30 and the bypass passage 36 join together.

Sensors for obtaining information on the operational state of the engine 2 are attached to respective points of the engine 2. An air flow meter 40, which measures the amount of air taken into the intake pipe 10, and an ambient air temperature sensor 48, which detects ambient air temperature, are attached to the intake pipe 10 downstream of the air cleaner 20. Moreover, a crank angle sensor 42, which detects engine speed, a coolant temperature sensor 44, which detects engine coolant temperature, a throttle valve opening degree sensor 46, which outputs a signal according to the opening degree of a throttle valve, and an exhaust gas temperature sensor 50, which detects exhaust gas temperature, and the like are provided.

The above-described various sensors and actuators are electrically connected to a control device 100. The control device 100 is an electronic control unit (ECU). The control device 100 controls an overall system of the engine 2, and is mainly composed of a computer including a CPU, a ROM, and a RAM. Various control routines to be described below are stored in the ROM. The operation of the engine 2 is controlled by the routines being executed by the control device 100 and the actuators being actuated based on the signals from the sensors.

Operation of Embodiment 1

The system of Embodiment 1 has a configuration for performing the operation of recirculating combustion gas into each cylinder via the EGR passage 30 (hereinafter referred to as "external EGR"). The external EGR is the operation that is effective for realizing a high EGR rate. However, the external EGR is not suitable for operating conditions in which the generation of condensed water in the EGR passage 30 or the adhesion of deposits becomes remarkable, such as immediately after the starting of the engine 2 or a case where the engine coolant temperature is extremely low or extremely high. In the system of the present Embodiment 1, the exhaust valve stop control of introducing internal EGR using the exhaust valve stop mechanism 18 is performed in the case of the operating conditions in which the engine 2 is not suitable for the execution of the external EGR. In the system of the present Embodiment 1, the external EGR is performed without executing the exhaust valve stop control in the case of the operating conditions in which the engine 2 is not suitable for the execution of the external EGR. In the system of the present Embodiment 1, the exhaust valve stop control and the external EGR are not executed in the case of the operating conditions in which the engine 2 is not suitable for the EGR operation. Hereinafter, the exhaust valve stop control will be described with reference to a drawing.

Figure 2:
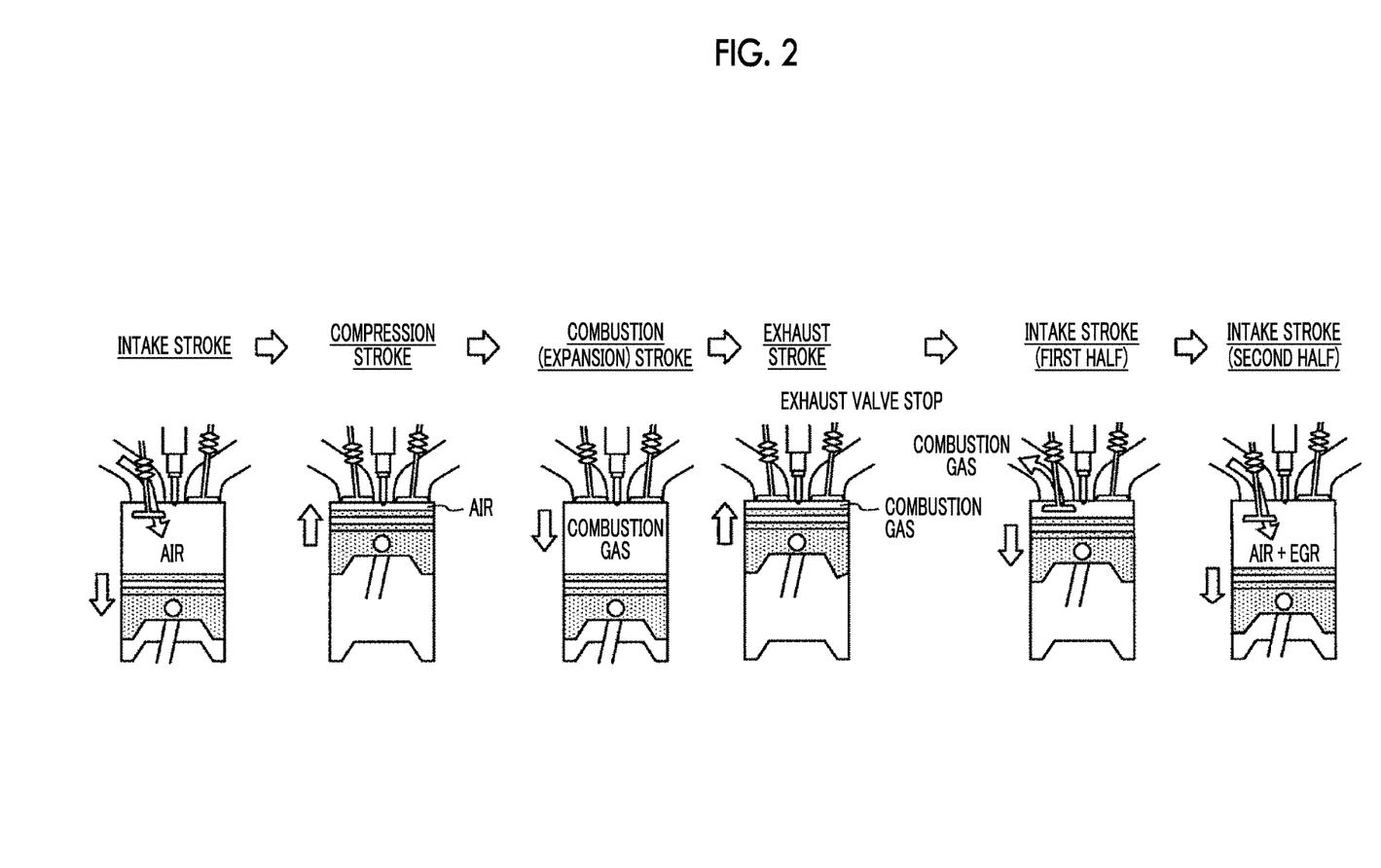
FIG. 2 is a view for describing exhaust valve stop control using an exhaust valve stop mechanism.

FIG. 2 is a view for describing the exhaust valve stop control using the exhaust valve stop mechanism 18. FIG. 2 schematically illustrates the inside of an exhaust valve stop cylinder. As illustrated in FIG. 2, in the exhaust valve stop cylinder during the execution of the exhaust valve step control, a combustion cycle based on an intake stroke, a compression stroke, a combustion (expansion) stroke, and an exhaust stroke is repeated. First, in the intake stroke, the intake valve is opened in a state where the exhaust valve is closed, and the piston moves down inside the cylinder. Accordingly, air is suctioned into a combustion chamber from the intake port. In the next compression stroke, the piston moves up inside the cylinder in a state where the intake valve and the exhaust valve are closed. Accordingly, the air of the combustion chamber is compressed. In the next expansion stroke, the fuel injected from the fuel injection valve 8 at least during a period of time of the compression stroke or the expansion stroke is combusted by self-ignition. The piston moves down inside the cylinder due to the expansion work caused by the combustion.

Figure 3:
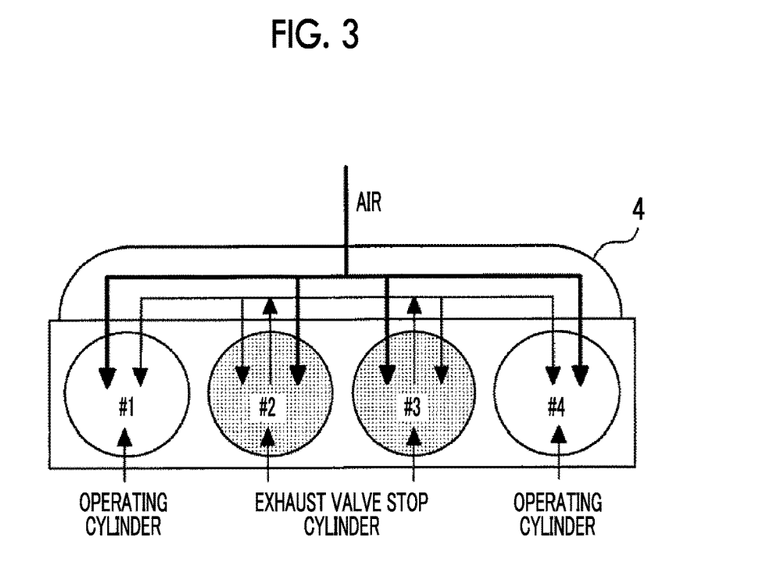
FIG. 3 is a view for describing the flow of intake in an intake stroke.

In the next exhaust stroke, the exhaust valve of the exhaust valve stop cylinder is stopped in a valve-closed state by the operation of the exhaust valve stop mechanism 18. Accordingly, the piston moves up inside the cylinder in a state where the intake valve and the exhaust valve are closed. The intake valve is opened in the next intake stroke. FIG. 3 is a view for describing the flow of intake in the intake stroke. When the intake valve is opened in a first half of the intake stroke as illustrated in FIG. 3, first, the combustion gas within the exhaust valve stop cylinder is blown back to the intake manifold 4 via the intake port. In the intake manifold 4, the air flowing into the intake manifold 4 from the intake passage, and the combustion gas blown back from the exhaust valve stop cylinder are mixed with each other. In a second half of the intake stroke, the air-fuel mixture of the intake manifold 4 is suctioned into the cylinder due to the negative pressure caused by the piston moving down inside the cylinder. The above-described valve operation in which the exhaust valves are stopped is performed in #2 cylinder and #3 cylinder that are the exhaust valve stop cylinders, and normal valve operation is performed by #1 cylinder and #4 cylinder that are the operating cylinders. Accordingly, the air-fuel mixture within the intake manifold 4 is sequentially suctioned into each cylinder.

Figure 4:
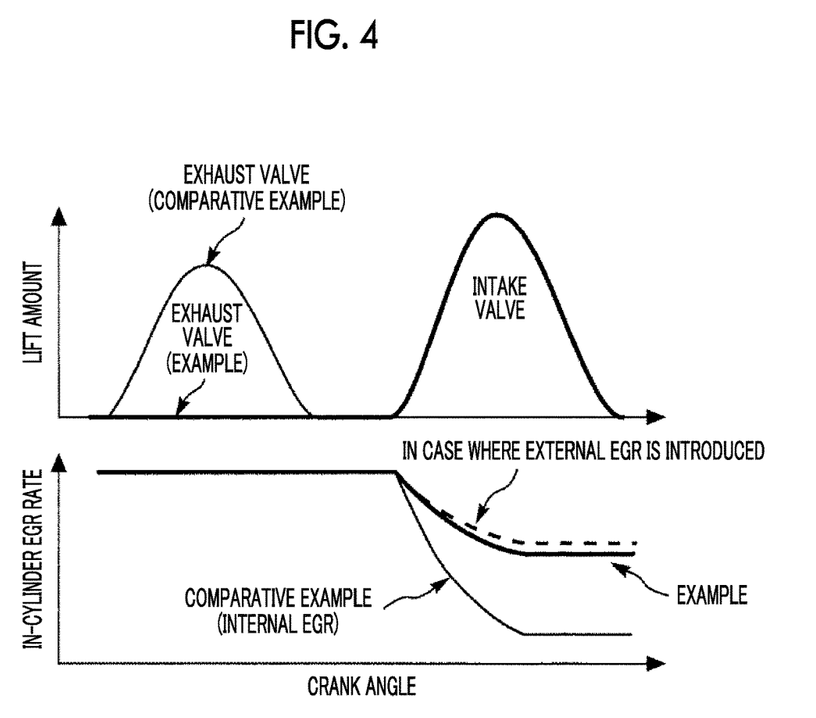
FIG. 4 is a view for describing the effects of the EGR operation of the system of Embodiment 1.

FIG. 4 is a view for describing the effects of the EGR operation of the system of Embodiment 1. A comparative example illustrated in FIG. 4 is an example in a case where the internal EGR is executed by negative overlap. In the EGR operation of the system of the present embodiment, all the combustion gas of #2 cylinder and #3 cylinder that are the exhaust valve stop cylinders is blown back to the intake manifold 4. According to the above-described operation, the EGR rate of the gas within the intake manifold 4 can be raised up to 50%. Accordingly, as illustrated in FIG. 4, since an EGR rate equal to external EGR that recirculates exhaust gas from the EGR passage 30 can be achieved, it is possible to effectively reduce the amount of NOx to be exhausted from the engine 2.

Specific Processing of Embodiment 1

Figure 5:
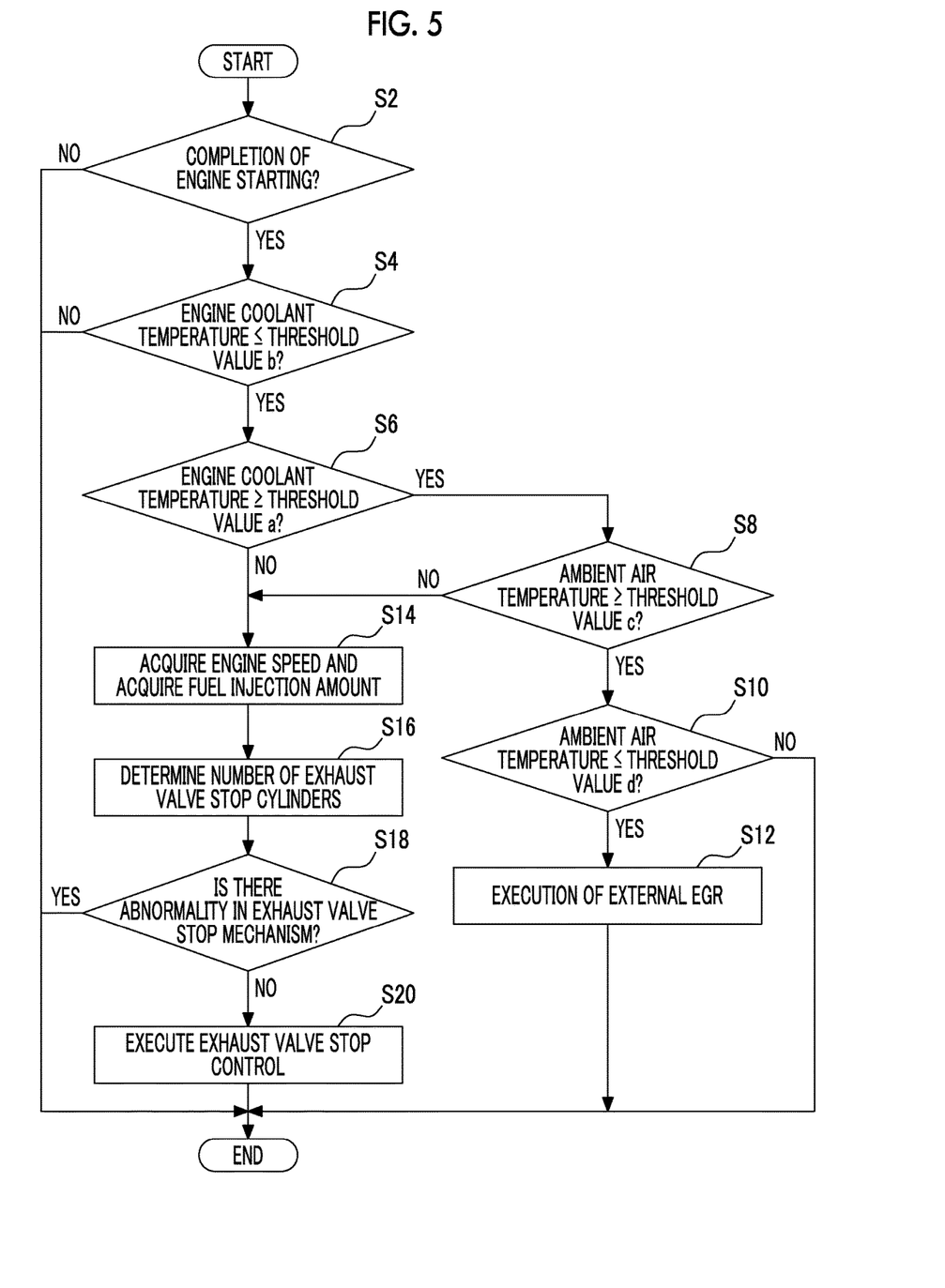
FIG. 5 is a flowchart illustrating a control routine to be executed by a control device in Embodiment 1.

Specific processing of EGR control to be executed in the system of the present Embodiment 1 will be described with reference to FIG. 5. FIG. 5 is a flowchart illustrating a control routine to be executed by the control device 100 according to Embodiment 1. The routine illustrated in FIG. 5 is repeatedly executed during the operation of the engine 2.

In the control routine illustrated in FIG. 5, first, whether or not the starting of the engine 2 is completed is determined (Step S2). Here, after the starting of the engine 2 whether or not the engine speed has reached a predetermined idle rotation speed is determined. As a result, in a case where the starting of the engine 2 is not determined to be completed, determination is made that there is a possibility that combustion becomes unstable due to the introduction of EGR. In this case, the main routine is ended without performing the exhaust valve stop control and the external EGR.

On the other hand, in Step S2, in a case where the starting of the engine 2 is determined to be completed, the process proceeds to the next step and whether or not the engine coolant temperature detected by the coolant temperature sensor 44 is equal to or lower than a threshold value b is determined (Step S4). As to the threshold value b herein, predetermined value (for example, 100° C.) is read as a threshold value for determining whether or not the engine 2 is in an overheated state. As a result of the determination of Step S4, in a case where the determination is not satisfied, the operating conditions are determined to be unsuitable for the execution of the EGR operation. In this case, the main routine is ended without performing the exhaust valve stop control and the external EGR.

On the other hand, in Step S4, in a case where the determination is satisfied, whether or not the engine coolant temperature detected by the coolant temperature sensor 44 is equal to or higher than a threshold value a is determined (Step S6). The threshold value a herein is a threshold value of the engine coolant temperature for determining whether or not the operating conditions are suitable for external EGR from viewpoints of the adhesion of the deposits or the generation of the condensed water in the EGR passage 30, and is set to, for example, 15° C. to 30° C.

In Step S6, in a case where the determination is satisfied, whether or not the ambient air temperature detected by the ambient air temperature sensor 48 is equal to or higher than a threshold value e (Step S8) is determined. The threshold value e herein is a threshold value of the ambient air temperature for determining whether or not the operating conditions are suitable for the external. EGR from a viewpoint of generation of the condensed water in the EGR passage 30. As a result in a case where the determination of Step S8 is satisfied, the process proceeds to the next step, and whether or not the ambient air temperature detected by the ambient air temperature sensor 48 is equal to or lower than a threshold value d is determined (Step S10). The threshold value d herein, is a threshold value of the ambient air temperature for determining whether the operating conditions are suitable for the EGR operation from a viewpoint of generation of smoke caused by a reduction in air density. As a result, in a case where the determination of Step S10 is not satisfied, the operating conditions are determined to be unsuitable for the execution of the EGR operation. In this ease, the main routine is ended without performing the exhaust valve stop control and the external EGR.

On the other hand, in Step S10, in a case where the determination is satisfied, the operating condition can be determined to be suitable for the introduction of the external EGR. In this case, the process proceeds to the next step where the external EGR is performed (Step S12). Here, specifically, the opening degree of the EGR valve 32 is controlled such that an actual EGR rate becomes a target EGR rate.

Figure 6:
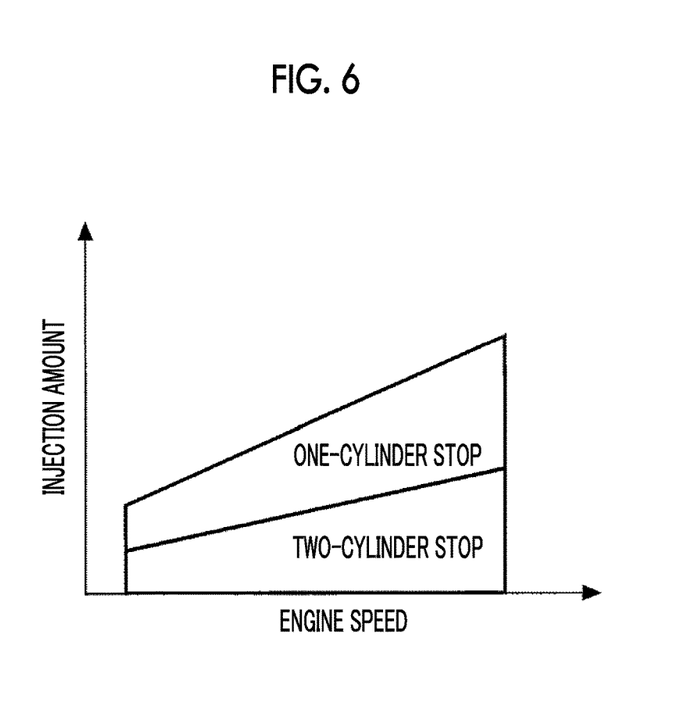
FIG. 6 is a view illustrating an example of a map for determining the number of exhaust valve stop cylinders.

On the other hand, in a case where the determination in Step S6 is not satisfied or in a case where the determination in Step S8 is not satisfied, the operating conditions are determined to be unsuitable for the introduction of the external EGR, and the process proceeds to the processing for performing the internal EGR by the exhaust valve stop control using the exhaust valve stop mechanism 18. Specifically, first, the fuel injection amount based on the engine speed and all-cylinders operation is acquired (Step S14). Next, the number of exhaust valve stop cylinders is determined (Step S16). FIG. 6 is a view illustrating an example of a map for determining the number of exhaust valve stop cylinders. Here, the number of exhaust valve stop cylinders corresponding to the engine speed and the fuel injection amount that are acquired in Step S14 (for example, two-cylinder stop) is specified using the map illustrated in FIG. 6.

Next, whether or not there is an abnormality in the exhaust valve stop mechanism 18 is determined (Step S18). Here, for example, whether or not a failure, a disconnection, a short-circuit, or the like of the exhaust valve stop mechanism 18 occurs is determined. As a result, in a case where an abnormality is determined to be in the exhaust valve stop mechanism 18, the main routine is ended without performing the exhaust valve stop control. On the other hand, in a case where no abnormality is determined to be in the exhaust valve stop mechanism 18, the process proceeds to the next step, and the exhaust valve stop control is performed (Step S20). Here, specifically the exhaust valve of the exhaust valve stop cylinder is stopped in a valve-closed state by the exhaust valve stop mechanism 18.

As described above, according to the system of the above-described Embodiment 1, even in the case of the operating conditions unsuitable for the external EGR, the EGR rate equal to the external EGR can be realized by the introduction of the internal EGR by the exhaust valve stop control. Accordingly, the amount of NOx exhausted from the engine 2 can be effectively reduced.

Meanwhile, in the system of the above-described Embodiment 3, whether or not the current operating conditions of the engine 2 are suitable for the external EGR is determined using the engine coolant temperature and the ambient air temperature. However, the method of determining whether or not the operating conditions of the engine 2 are suitable for the external EGR is not limited to this, and a configuration in which the determination is made using other parameters, such as intake air temperature may be adopted. Additionally, a configuration in which the EGR operation is performed by executing the above-described exhaust valve stop control without determining whether or not the operating conditions are suitable for the external EGR may be adopted.

In the system of the above-described Embodiment 1, the engine 2 in which the four cylinders are disposed in series has been described as an example. However, the number of cylinders and the arrangement of cylinders are not limited when a multiple-cylinder engine having a plurality of cylinder is configured. In the system of the above-described Embodiment 1, a configuration using the exhaust valve stop mechanism 18 having #2 cylinder and #3 cylinder as the exhaust valve stop cylinders has been described. However, other cylinders may be used as the exhaust valve stop cylinders.

Embodiment 2

Embodiment 2 of the present disclosure will be described with reference to drawings. The system of Embodiment 2 can be realized by using the same hardware configuration as that of Embodiment 1.

Figure 7:
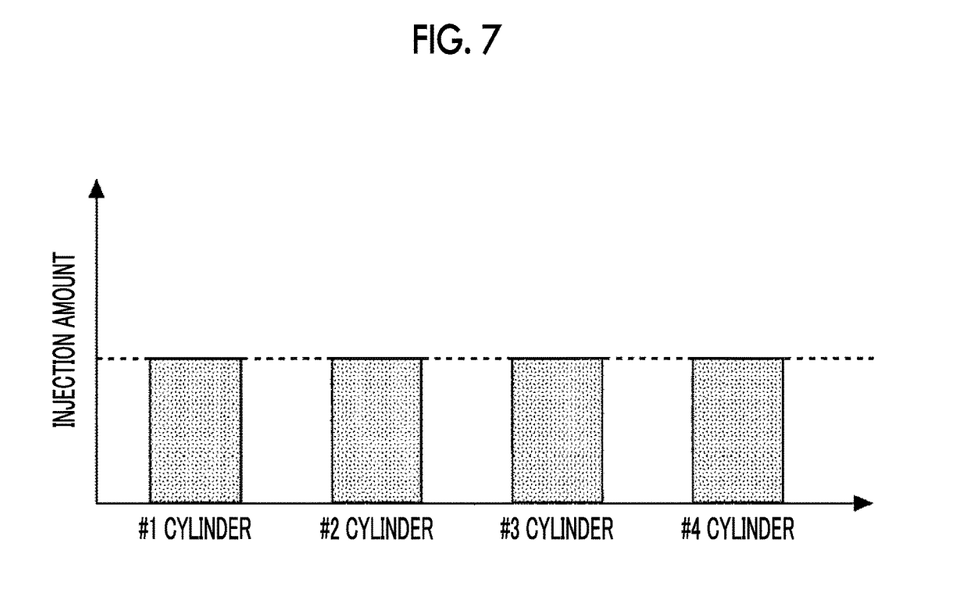
FIG. 7 is a view of the fuel injection amounts of respective cylinders that are compared with each other in a case where the exhaust valve stop control is not executed.

In the system of the above-described Embodiment 1, the amount of NOx to be exhausted from the engine 2 is reduced by the introduction of the internal EGR by the exhaust valve stop control. In contrast, the system of Embodiment 2 is characterized in that the injection amount control of reducing the fuel injection amount of the exhaust valve stop cylinders to be smaller than the feel injection amount of the operating cylinders is executed during the execution of the exhaust valve stop control. FIG. 7 is a view of the fuel injection amounts of respective cylinders that are compared with each other in a case where the exhaust valve stop control is not executed. As illustrated in FIG. 7, in a case where the exhaust valve stop control is not executed, the fuel injection amounts of respective cylinders are the same amount from a viewpoint of vibration suppression.

Figure 8:
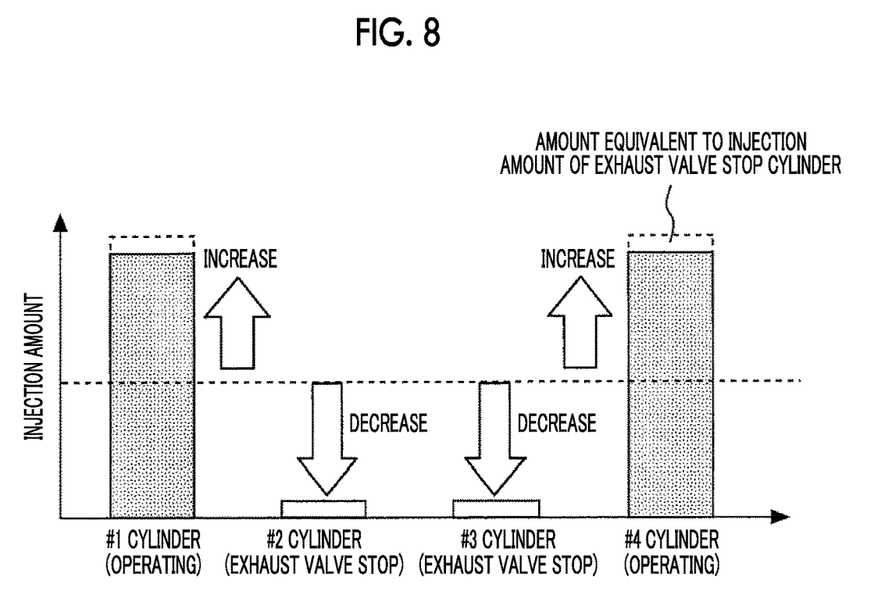
FIG. 8 is a view of the fuel injection amounts of the respective cylinders that are compared with each other in a case where the exhaust valve stop control is executed.

On the other hand, FIG. 8 is a view of the fuel injection amounts of the respective cylinders that are compared with each other in a case where the exhaust valve stop control is executed. As illustrated in FIG. 8, in a case where the exhaust valve stop control is executed, the fuel injection amount of #2 cylinder and #3 cylinder that are the exhaust valve stop cylinders is reduced, and the fuel injection amount of #1 cylinder and #4 cylinder that are the operating cylinders is increased. The fuel injection amount of #2 cylinder and #3 cylinder is set to, for example, the minimum fuel injection amount capable of being realized in terms of the structure of the fuel injection valve 8. In this case, solely the fuel injection amount of #1 cylinder and #4 cylinder is increased by the reduced amount in #2 cylinder and #3 cylinder such that the same torque as that in a case where the exhaust valve stop control is not executed is obtained. According to the above-described injection amount control, since the injection amount of #1 cylinder and #4 cylinder is increased to the injection amount that is slightly smaller than twice the injection amount in a case where fuel is equally distributed to the respective cylinders, the effect of increasing the exhaust gas temperature as shown below can be obtained.

Figure 9:
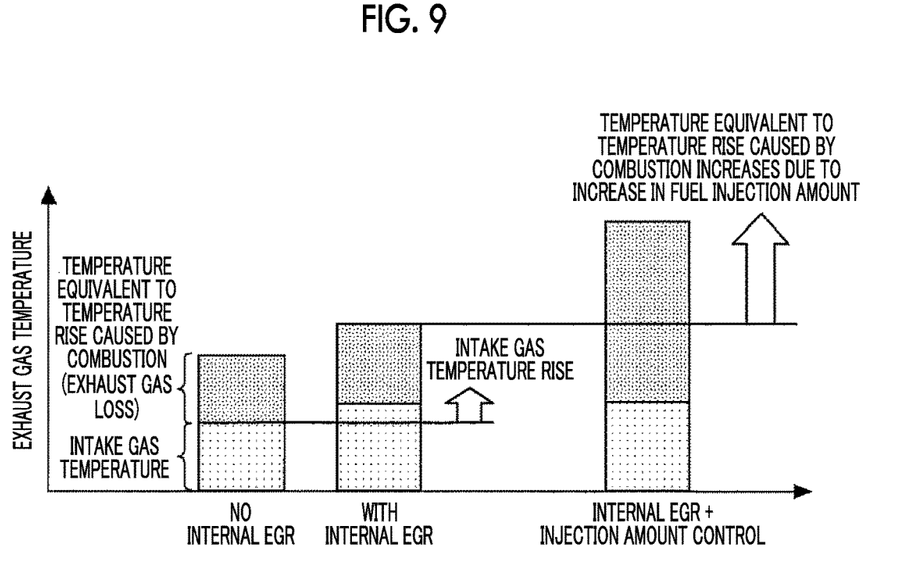
FIG. 9 is a view for describing the rise operation of exhaust gas temperature according to injection amount control.

FIG. 9 is a view for describing the rise operation of the exhaust gas temperature according to the injection amount control. A left side in FIG. 9 illustrates the exhaust gas temperature when the internal EGR is not introduced, a central part in FIG. 9 illustrates the exhaust gas temperature when the internal EGR by the exhaust valve stop control is introduced, and a right side in FIG. 9 illustrates the exhaust gas temperature when the injection amount control is executed in addition to the internal EGR by the exhaust valve stop control. As illustrated on the central part of FIG. 9, when the injection amount control is further performed in addition to the introduction of the internal EGR, the exhaust gas temperature rises greatly due to the combustion of the operating cylinders in which the injection amount is increased.

Figure 10:
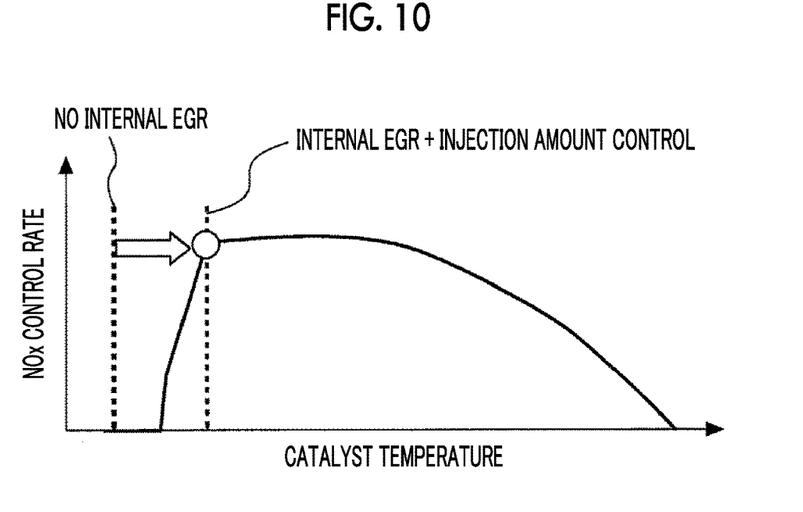
FIG. 10 is a view illustrating changes in NOx control rate with respect to the catalyst temperature of a catalyst device.

When the exhaust gas temperature rises, the catalyst temperature of the catalyst device 26 disposed at the exhaust pipe 12 can be raised. FIG. 10 is a view illustrating changes in NOx control rate with respect to the catalyst temperature of the catalyst device 26. As illustrated in FIG. 10, since the catalyst temperature can be raised when the injection amount control is executed during the introduction of the internal EGR by the exhaust valve stop control, a higher NOx control rate can be obtained. As described above, according to the system of Embodiment 2, the exhaust gas temperature can be controlled by controlling the injection amount of the exhaust valve stop cylinders.

Meanwhile, in the system of the above-described Embodiment 2, in the injection amount control, the injection amount of the exhaust valve stop cylinders is reduced to the minimum injection amount. However, the injection amount of the exhaust valve stop cylinders is not limited to this. That is, when the fuel injection amount of the operating cylinders is made to be larger than the fuel injection amount of the exhaust valve stop cylinders without changing the total fuel injection amount of all cylinders, it is possible to obtain the effect of raising the exhaust gas temperature without changing the torque to be generated.

Embodiment 3

Embodiment 3 of the present disclosure will be described with reference to drawings. The system of Embodiment 3 can be realized by executing a routine illustrated in FIG. 12 (to be described below) on the control device 100, using the same hardware configuration as that of Embodiment 1.

In the compression ignition type internal combustion engine like the engine 2, the combustion temperature is controlled depending on intake oxygen concentration, which is a proportion of oxygen in the gas suctioned into each cylinder, to suppress the amount of NOx produced. For this reason, in a case where the catalyst device 26 has reached an activating temperature at which a sufficient NOx control rate is obtained, the intake oxygen concentration is controlled to be a target intake oxygen concentration that is a target value. This is useful in reducing NOx emission. On the other hand, in a case where the catalyst device 26 has not reached the activating temperature, for example, immediately after the completion of starting of the engine 2, the temperature rise of the catalyst device 26 is promoted by raising the exhaust gas temperature. This is useful in reducing the NOx emission.

Figure 11:
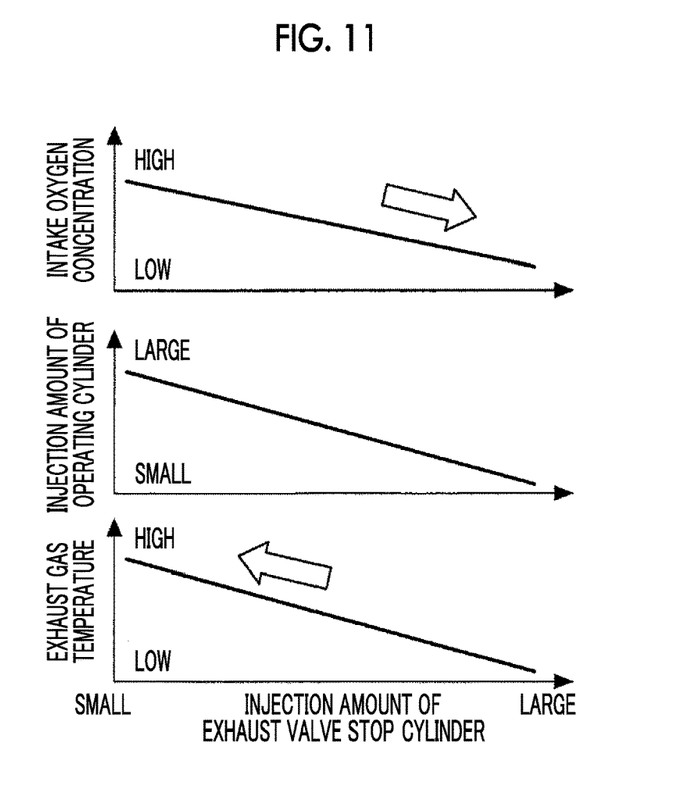
FIG. 11 is a view illustrating changes in various state quantities with respect to changes in the injection amount of the exhaust valve stop cylinders.

FIG. 11 is a view illustrating changes in various state quantities with respect to changes in the injection amount of the exhaust valve stop cylinders. When the injection amount of the exhaust valve stop cylinders is increased, fuel-rich combustion gas is blown back by the exhaust valve stop control. For this reason, as illustrated in FIG. 11, the intake oxygen concentration becomes lower as the injection amount of the exhaust valve stop cylinders is increased. Thus, when the injection amount of the exhaust valve stop cylinders is changed in the injection amount control, the intake oxygen concentration can be controlled to be the target intake oxygen concentration. When the injection amount of the exhaust valve stop cylinders is reduced as illustrated in FIG. 11, since the injection amount of the operating cylinders is increased in order to generate equal torque, the exhaust gas temperature rises consequently. For this reason, when the injection amount of the exhaust valve stop cylinders is changed in the injection amount control, the exhaust gas temperature can be controlled.

In the system of Embodiment 3, the injection amounts of the injection amount control are changed in accordance with the presence/absence of a request (hereinafter referred to as "an exhaust gas temperature raising request") for raising the exhaust gas temperature in order to raise the temperature of the catalyst device 26 up to the activating temperature. In more detail, in a case where there is an exhaust gas temperature raising request, the injection amount control with priority given to the control of the exhaust gas temperature is executed, and in a case where there is no exhaust gas temperature raising request, the injection amount control with priority given to the control of the intake oxygen concentration is executed. According to the above-described control, it is possible to effectively reduce the NOx emission.

Specific Processing of Embodiment 3

Figure 12:
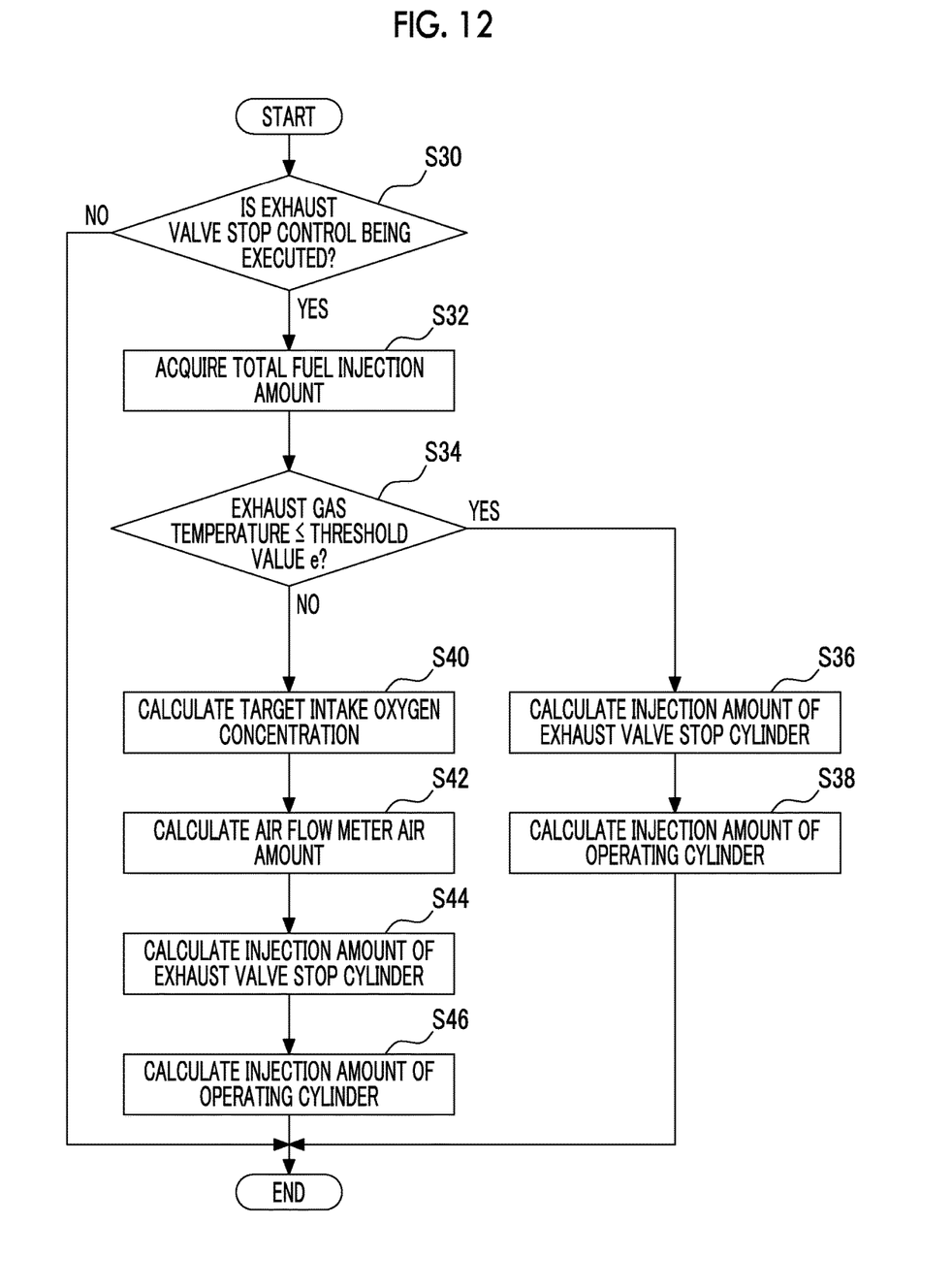
FIG. 12 is a flowchart illustrating a control routine to be executed by a control device in Embodiment 3.

The specific processing for determining the injection amounts of the respective cylinders in the fuel injection control to be executed in the system of the present Embodiment 3 will be described with reference to FIG. 12. FIG. 12 is a flowchart illustrating a control routine to be executed by the control device 100 according to Embodiment 3. The routine illustrated in FIG. 12 is repeatedly executed during the operation of the engine 2.

In the control routine illustrated in FIG. 12, first, whether or not the exhaust valve stop control is being executed is determined (Step S30). As a result, the main routine is ended in a case where the exhaust valve stop control is not determined as being executed. On the other hand, in a case where the exhaust valve stop control is determined to be during execution in Step S30, the processing proceeds to the next step, and the total fuel injection amount is acquired (Step S32). Here, specifically, the total fuel injection amount for realizing a needed torque calculated from the opening degree of the throttle valve by the operation of all cylinders is acquired.

Next, whether or not the exhaust gas temperature is smaller than a threshold value e is determined (Step S34). The threshold value e is a threshold value of the exhaust gas temperature for determining whether or not there is a need for raising the catalyst temperature of the catalyst device 26, for example, the activating temperature (for example, 200° C.) of the catalyst device 26 is read as the threshold value e. As a result, in a case where the determination is satisfied, a request for raising the exhaust gas temperature is determined to be present, and the process proceeds to the processing for calculating the feel injection amount for maximizing the exhaust gas temperature. Specifically, first, the injection amount of the exhaust valve stop cylinders is determined (Step S36). Here, specifically, the minimum injection amount capable of being realized in terms of the structure of the fuel injection valve 8 is determined as the injection amount of the exhaust valve stop cylinders.

Next, the injection amount of the operating cylinders is determined using the following Formula (1) (Step S38). In the following Formula (1), A represents the total fuel injection amount acquired in Step S32, and C represents the injection amount of the exhaust valve stop cylinders acquired in Step S36.

Injection amount of operating cylinder=(A=Number of exhaust valve stop cylinders×C)/Number of operating cylinders  (1)

As a result, in a case where the determination of Step S34 is not satisfied, a request for raising the exhaust gas temperature is not determined to be present, and the process proceeds to the processing of calculating the fuel injection amount for controlling the intake oxygen concentration to be the target intake oxygen concentration. Specifically, first, the target intake oxygen concentration is calculated based on the engine speed and the total fuel injection amount (Step S40). Next, the amount of air suctioned by the air flow meter 40 to the intake pipe 50 (hereinafter referred to as "air flow meter air amount") is acquired (Step S42). Next, the injection amount of exhaust valve stop cylinders is calculated using the following Formula (2) (Step S44). Here, for example, 23.1 wt % can be used for the ambient air oxygen concentration, and the EGR rate can be calculated by the following Formula (3). Since the number of cylinders is four in the engine 2 of Embodiment 3, the EGR rate is 50%, for example, in a case where the number of exhaust valve stop cylinders is two.

Injection amount of exhaust valve stop cylinders= (Ambient air oxygen concentration [wt %]–Target intake oxygen concentration [wt %])×Amount of air [g/s])/(Ambient air oxygen concentration [wt %]×(EGR rate [%]/100)×Stoichiometric air-feel ratio)  (2)

EGR rate [%]=(Number of exhaust valve stop cylinders/Number of cylinders)×100  (3)

Next, the injection amount of the operating cylinders is determined using the following Formula (4) (Step S46). In the following Formula (4), A represents the total fuel injection amount acquired in Step S32, and B represents the injection amount of the exhaust valve stop cylinders acquired in Step S44.

Injection amount of operating cylinder=(A−Number of exhaust valve stop cylinders×B)/Number of operating cylinders  (4)

As described above, according to the system of the above-described Embodiment 3, different kinds of fuel injection control can be performed depending on the presence/absence of an exhaust gas temperature raising request. Accordingly, it is possible to effectively reduce the NOx emission.

Meanwhile, in the system of the above-described embodiment 3, the presence/absence of an exhaust gas temperature raising request is determined by the comparison between the exhaust gas temperature and the threshold value e. However, a configuration may be adopted in which the catalyst temperature is detected or estimated and is compared with the activating temperature.

In the system of the above-described Embodiment 3, the intake oxygen concentration is used as a parameter that indicates the proportion of oxygen in the gas suctioned into each cylinder. However, intake oxygen concentration can be instead of the intake oxygen density.

What is claimed is:

1. A control device for an internal combustion engine, the internal combustion engine including a plurality of cylinders, a plurality of intake ports, a plurality of exhaust ports, a plurality of intake valves, a plurality of exhaust valves, a plurality of fuel injection valves, and an exhaust valve stop mechanism, the intake ports being configured to communicate with the cylinders from an intake passage of the internal combustion engine, respectively, the exhaust ports being configured to communicate with the cylinders from an exhaust passage of the internal combustion engine, respectively, the intake valves being configured to open and close the intake port communicating with the cylinders, respectively, the exhaust valves being configured to open and close the exhaust port communicating with the cylinders, respectively, and the fuel injection valves being configured to inject fuel into the cylinders, respectively, the exhaust valve stop mechanism being configured to selectively stop the exhaust valves of the exhaust ports of some cylinders of the cylinders in a valve-closed state, the control device comprising:
an electronic control unit configured to
control the fuel injection valves so as to inject the fuel into the some cylinders at least during a period of time of a compression stroke or an expansion stroke of the some cylinders,
control the exhaust valve stop mechanism so as to stop the exhaust valves of the exhaust ports of the some cylinders from opening during an exhaust stroke such that the exhaust ports of the some of the cylinders are in a valve-closed state, and
control the intake valves so as to open the intake valves at least during a period of time of an intake stroke of the some cylinders such that exhaust gas is recirculated to each of the cylinders via the intake ports of the some cylinders.

2. The control device according to claim 1, wherein the electronic control unit is configured to limit execution of a control in which the exhaust gas is recirculated via the intake ports of the some cylinders before starting of the internal combustion engine is completed.

3. The control device according to claim 1, wherein the electronic control unit is configured to determine execution or non-execution of a control in which the exhaust gas is recirculated via the intake ports of the some cylinders in accordance with a coolant temperature of the internal combustion engine.

4. The control device according to claim 1, wherein the electronic control unit is configured to determine execution or non-execution of a control in which the exhaust gas is recirculated via the intake ports of the some cylinders in accordance with ambient air temperature.

5. The control device according to claim 1, wherein:
the internal combustion engine includes a catalyst device in the exhaust passage; and
the electronic control unit is configured to control the fuel injection valves so as to change an injection amount of the fuel to be injected into the some cylinders such that intake oxygen concentration that is a proportion of oxygen in gas suctioned into the some cylinders or temperature of the exhaust gas to be exhausted into the exhaust passage during execution of a control in which the exhaust gas is recirculated via the intake ports of the some cylinders is adjusted.

6. The control device according to claim 5, wherein:
the electronic control unit is configured to control the fuel injection valves so as to change the injection amount of the fuel to be injected into the some cylinders such that the intake oxygen concentration reaches a predetermined target value in a case where the temperature of the exhaust gas flowing into the catalyst device has reached a predetermined threshold value; and
the electronic control unit is configured to control the fuel injection valves such that the injection amount of the some cylinders of the cylinders becomes smaller than an injection amount of the other cylinders of the cylinders in a case where the temperature of the exhaust gas flowing into the catalyst device has not reached the predetermined threshold value.

* * * * *

UNITED STATES PATENT AND TRADEMARK OFFICE
CERTIFICATE OF CORRECTION

PATENT NO. : 10,473,044 B2
APPLICATION NO. : 15/895426
DATED : November 12, 2019
INVENTOR(S) : Sho Nakamura It is certified that error appears in the above-identified patent and that said Letters Patent is hereby corrected as shown below:

On the Title Page

Item (57), abstract, Line 3, delete "values" and insert --valves--, therefor.

Item (57), abstract, Line 7, delete "feel" and insert --fuel--, therefor.

In the Specification

In Column 2, Line 46, delete "feel" and insert --fuel--, therefor.

In Column 2, Line 63, delete "feel" and insert --fuel--, therefor.

In Column 3, Line 5, delete "alliance" and insert --enhance--, therefor.

In Column 3, Lines 16 & 17, delete "temperatore" and insert --temperature--, therefor.

In Column 4, Line 56, delete "dearly" and insert --clearly--, therefor.

In Column 6, Line 43, delete "step" and insert --stop--, therefor.

In Column 8, Line 10, delete "value e" and insert --value c--, therefor.

In Column 8, Line 11, delete "value e" and insert --value c--, therefor.

In Column 8, Line 13, delete "external. EGR" and insert --external EGR--, therefor.

In Column 8, Line 15, after "result", insert --,--.

In Column 8, Line 20, after "herein", delete ",".

Signed and Sealed this
Eighteenth Day of February, 2020

Andrei Iancu
*Director of the United States Patent and Trademark Office*

In Column 8, Line 27, delete "ease" and insert --case--, therefor.

In Column 9, Line 9, delete "Embodiment 3" and insert --Embodiment 1--, therefor.

In Column 9, Line 46, delete "feel" and insert --fuel--, therefor.

In Column 10, Lines 20 & 21, after "FIG.9,", insert --since the intake air temperature rises when the internal EGR is introduced, the exhaust gas temperature also rises by the same amount. In contrast, as illustrated on the right side in FIG. 9,--.

In Column 12, Line 5, delete "feel" and insert --fuel--, therefor.

In Column 12, Line 18, delete "(A=Number" and insert --(A-Number--, therefor.

In Column 12, Line 45, delete "feel" and insert --fuel--, therefor.